(12) United States Patent
Tomlinson et al.

(10) Patent No.: US 7,698,554 B2
(45) Date of Patent: Apr. 13, 2010

(54) CONTROLLING TRANSMISSION OF BROADCAST CONTENT

(75) Inventors: Allan Tomlinson, Surrey (GB); Alexander William Dent, Surrey (GB)

(73) Assignee: Royal Holloway and Bedford New College, Egham (GB)

( * ) Notice: Subject to any disclaimer, the term of this patent is extended or adjusted under 35 U.S.C. 154(b) by 775 days.

(21) Appl. No.: 11/056,681

(22) Filed: Feb. 11, 2005

(65) Prior Publication Data

US 2005/0272405 A1 Dec. 8, 2005

(30) Foreign Application Priority Data

Feb. 13, 2004 (GB) ................................. 0403218.1

(51) Int. Cl.
*H04L 9/32* (2006.01)
(52) U.S. Cl. ..................................................... 713/168
(58) Field of Classification Search ................... 713/168
See application file for complete search history.

(56) References Cited

U.S. PATENT DOCUMENTS

| 4,750,036 | A |   | 6/1988 | Martinez | |
|---|---|---|---|---|---|
| 5,621,793 | A | * | 4/1997 | Bednarek et al. | 380/240 |
| 6,507,907 | B1 | * | 1/2003 | Takahashi et al. | 713/150 |
| 2001/0039210 | A1 | * | 11/2001 | St-Denis | 463/42 |
| 2002/0089960 | A1 | * | 7/2002 | Shuster | 370/338 |
| 2003/0236120 | A1 | * | 12/2003 | Reece et al. | 463/42 |
| 2004/0059914 | A1 | * | 3/2004 | Karaoguz | 713/168 |
| 2005/0234735 | A1 | * | 10/2005 | Williams | 705/1 |

FOREIGN PATENT DOCUMENTS

| WO | WO99/53624 | A1 | 10/1999 |
|---|---|---|---|
| WO | WO2004/023789 | A2 | 3/2004 |

* cited by examiner

*Primary Examiner*—Nasser Moazzami
*Assistant Examiner*—Michael S McNally
(74) *Attorney, Agent, or Firm*—Leydig, Voit & Mayer, Ltd.

(57) ABSTRACT

A broadcast control method includes validating a time and location of an end user device by verifying the identity and location of a device on the intermediary network; sending a nonce from a intermediary network to an end user device at a first time; sending the nonce from the end user to the network at a second time; sending an encrypted request for content from the network to a broadcast system; decrypting the request to verify the identities of the devices and the time and location data; and sending content from the broadcast system to the end user device if the identities are verified and the time interval between the first and second times is less than the predetermined time interval.

16 Claims, 2 Drawing Sheets

CONTROLLING TRANSMISSION OF BROADCAST CONTENT

FIELD OF THE INVENTION

This invention relates to a method of controlling transmission of broadcast content from a content provider via a broadcast means to an end user device using an intermediary network

BACKGROUND OF THE INVENTION

Advances in mobile telecommunications technology are providing the potential to deliver new services to subscribers, including interactive multimedia services to mobile end user devices instantly, wherever they are. The delivery of such services, using encrypted digital multimedia content, raises problems about digital rights management (DRM), in other words, the ability of the content provider to prevent unauthorised copying of the content. There is currently interest in the development of DRM languages and DRM system architectures.

Successful DRM architectures must be trusted by the content provider. This requires trust in the computing platform that supports the system, and trust in any external data sources that determine the conditions under which the content may be used. The ability to manipulate these usage conditions represents a threat to any DRM system.

One specific case where this threat may defeat a DRM system is the implementation of broadcast blackouts. Broadcasters are often required by content providers to restrict broadcasts of certain content to specific geographical regions, or specific dates and times. The reasons for doing so could be to meet local regulations, or to meet commercial terms agreed with the content provider.

For example coverage of a sporting event may be forbidden in areas immediately surrounding the stadium while the event is taking place. Subscribers in other regions may pay a premium rate to view the live event. Immediately after the event the content may be available in all regions at a reduced cost.

Currently, broadcasters use conditional access systems that scramble the service in a manner that can only be unscrambled by receivers with specific regional codes embedded in them. The assumption is that these receivers remain relatively static.

Although in theory it may be possible to track the location of mobile receivers, using for example satellite ranging or GPS, this is not practical for low cost mobile devices, such as mobile phones, with no satellite receiver or GPS capability. Also, receivers may have the ability to store and forward the content.

This redefines the problem of broadcast blackouts: current solutions ensure that the point of reception is outside the blackout region. What is required now is proof that the end user is outside the blackout region.

Therefore the current time and location of each device capable of rendering content must be made available to the DRM application in a trustworthy manner. The difficulty in attaining this trust is compounded by the fact that it is the user who is most likely to try to deceive the application; it is not the user who needs to trust the time/location information but the content provider.

Work has been done on determining the location of a device with respect to a fixed local transmitter, but this is not applicable on a national scale, and the issue of trust is not relevant. The recently-proposed Echo protocol (by Sastry, Shankar and Wagner in WISE03, Assoc. Computing Machinery, September 2003) addresses the problem of trustworthy location data. However, as it is designed for physical access control, and uses ultrasonics and fixed transmitters, it is not suitable for controlling transmission of broadcast content.

OBJECTS AND SUMMARY OF THE INVENTION

According to the present invention, a method of controlling transmission of broadcast content from a content provider via a broadcast means to an end user device using an intermediary network comprises validating the time and location of the end user device by:

verifying the identity and location of a device on the intermediary network;

sending a nonce from a first device to a second device at a first time, one device being the intermediary network device and the other the end user device;

sending the nonce from the second device to the first device to be received at a second time;

comparing the elapsed time interval between the first and second times with a predetermined time interval;

sending an encrypted request for content including the time and location data from the first device to the broadcast means;

decrypting the request to verify the identities of the first and second devices and the time and location data; and sending content from the broadcast means to the end user device if the identities are verified and the elapsed time interval is less than the predetermined time interval.

If the elapsed time interval is less than a predetermined time interval, this ensures that the end user device is sufficiently near the intermediary network device to provide reliable data, so that the location of the end user device can be determined. The verification of the identities of the devices; the time and location data; and the nonce ensures that the data is fresh—in other words that it has not been replayed. This provides the necessary trust for the broadcast means.

It will be understood that a nonce is a randomly-generated data string which is used only once, so that its freshness can be determined.

The sending of the nonce and the subsequent steps will be repeated at regular intervals to ensure that the location of the end user device is still acceptable.

The intermediary network device preferably comprises a stationary location server, whose location is known, and can be verified to the broadcast means.

The end user device may comprise a portable personal computer, connected to the intermediary network by wireless access or in any other suitable way. It could alternatively be a mobile telephone, PDA or the like.

The broadcast means preferably comprises a broadcast transmitter, whether terrestrial, cable or satellite, together with a set-top box, under the control of the broadcaster, and which stores usage criteria for the services supplied.

Conveniently, the end user device and the set-top box each have microprocessors including a secure execution environment to carry out cryptographic processing, and tamper-proof data storage areas accessed only by programs running in the secure execution environment. An authorised cryptographic key is shared by the set-top box and the end-user device, and at least one of them has a public verification for a certification authority, for verifying the identity of the location server.

The set-top box also has a DRM program stored in the tamper-proof data storage area. The end user device may also have a DRM program similarly stored.

In one embodiment, when content is requested from the broadcast means, the method operates by:

using the end user device to verify the identity of the location server;

sending a nonce from the end user device to the location server at a first time stored by the end user device;

sending time and location data and the encrypted nonce from the location server to the end user device;

storing the second time at the end user device as the time of receipt from the location server;

comparing the interval between the first and second times with a predetermined time interval stored at the end user device;

verifying, at the end user device, the time and location data from the location server;

sending the time and an encryption of the time from the end user device to the set-top box;

decrypting the data at the set-top box to verify the identity of the end user device; and delivering the content from the set-top box to the end user device.

It will be appreciated that this method places a high computational load on the end user device, which needs to generate the nonces and perform the verification of the location server. The location server also has a high load, as it may need to send many encrypted messages in a short time.

In a second embodiment, the computational load is transferred to the set-top box, which can be better configured to deal with it.

Thus, in the second embodiment, when content is requested from the broadcast means, the method operates by:

using the set-top box to find the location server nearest to the end user device;

using the set-top box to verify the identity of the location server;

sending a nonce and identity of the end user device from the set-top box to the location server;

storing the first time at the location server, and forwarding the nonce to the end user device;

encrypting the nonce at the end user device, and sending the encrypted nonce to the location server;

storing the second time at the location server as the time of receipt from the end user device;

comparing the interval between the first and second times with a predetermined time interval stored at the location server;

sending time and location data and the encrypted nonce, and this information encrypted by the location server, from the location server to the set-top box;

decrypting, at the set-top box, the location server encryption to verify the time and the location data, and the nonce to verify the identity of the end user device; and delivering the content from the set-top box to the end user device.

It will be appreciated that in this method most of the computational load involved in generating the nonce and decrypting information is performed by the set-top box.

Other aspects of the invention relate to the separate use of the method by the broadcast means, the intermediary network and the end user device, computer usable media containing program code for carrying out the method, and computer readable signals enabling the carrying out of the method.

BRIEF DESCRIPTION OF THE DRAWINGS

Two embodiments of the method are illustrated, by way of example only, in the accompanying drawings, in which.

DETAILED DESCRIPTION OF THE PREFERRED EMBODIMENTS

Figure 1:
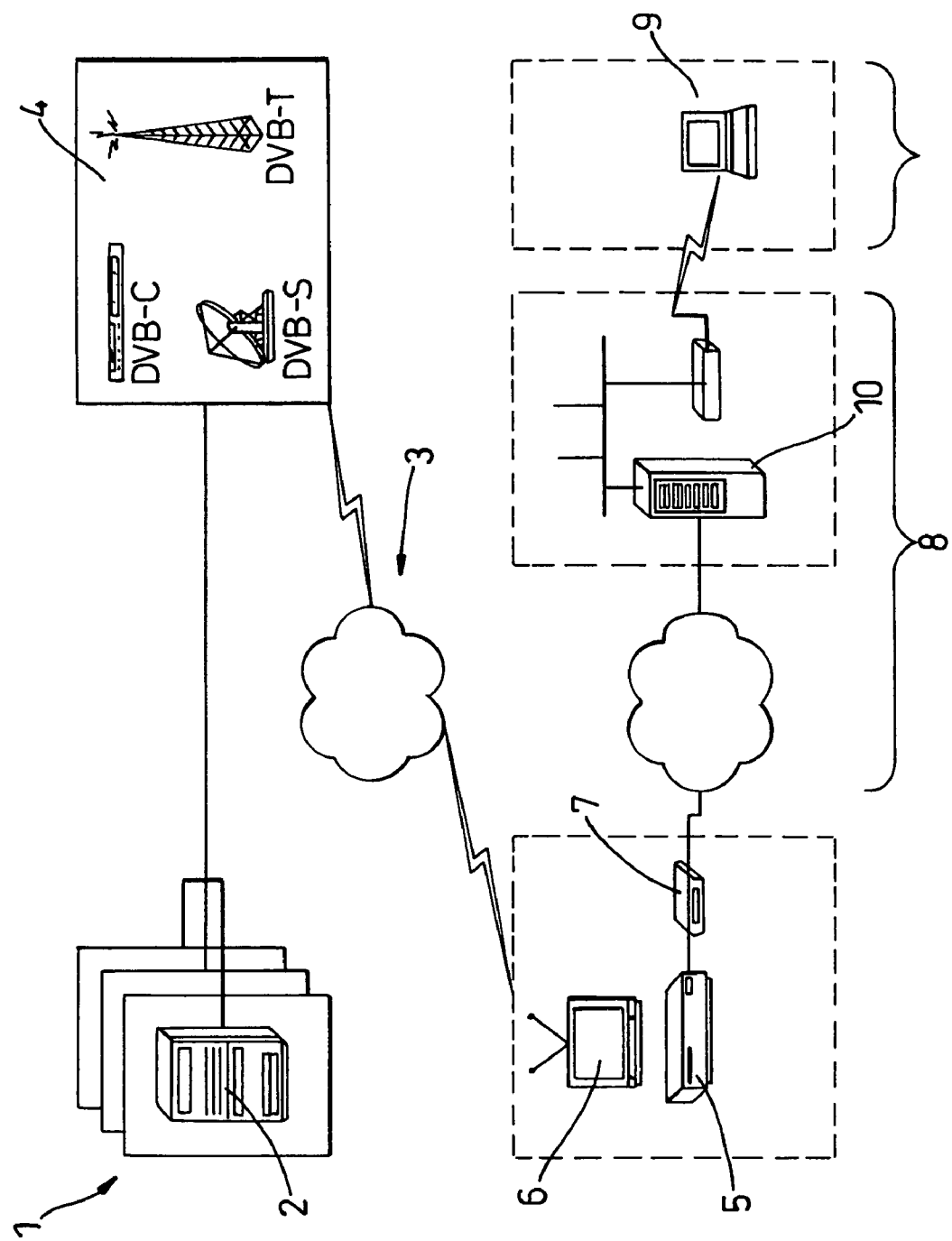
FIG. 1 is a schematic diagram of the hardware used in the method.

In FIG. 1 a content provider 1 makes available content in the form of a video source 2, from which a video signal is sent to a broadcast means 3, comprising a terrestrial, cable or satellite transmitter 4 for broadcasting the signal, and a set-up box 5 for receiving the signal. The set-top box 5 is typically connected to a television 6 for viewing the signal, but it is also connected by a modem 7 and an intermediary network 8 to an end user device 9, for viewing by the user. In this case the end user device 9 is a portable personal computer, connected to the intermediary network wirelessly. The intermediary network 8 has several stationary servers 10, one only of which is shown.

The content will be digital and encrypted. The set-top box 5 is controlled by the broadcaster, and provides a secure platform to manage viewing rights. The user, however, may have the ability to manipulate data that enters and leaves the secure platform. It should also be noted that part of the intermediary network could be under the control of the user.

Thus, in use, a broadcaster purchases content from a content provider in order to sell this content to a subscriber. The content provider is free to place restrictions on the location and time that his content may be viewed. The broadcaster then delivers the content to the subscriber's set-top box. The set-top box is then able to forward the content, via the intermediary network, to the user's laptop, where it can be rendered.

It is important that some part of this intermediary network is trusted by the content provider, although part of the network may be controlled by the user. This models the situation where the end device is connected to the trusted network via a second device, such as a cellular phone, controlled by the user.

This means that the user may attempt to alter, delete or insert messages at any stage between the set-top box and the end device. This also allows the user to forward the content some distance away from the trusted network.

The trusted part of the intermediary network can offer generic time and location services to both the end device and the set-top box that will help it authenticate its time and position.

The following notation is used to describe the methods:

| | |
|---|---|
| STB | denotes the initial receiver |
| ED | denotes the end device |
| IN | denotes the intermediary network |
| LS | denotes the location server closest to ED |
| CA | denotes a trusted certification authority |
| $Cert_X$ | is a public key certificate for entity X |
| $K_{X,Y}$ | denotes a secret key possessed only by X and Y |
| $ID_X$ | denotes the unique ID of entity X |
| $R_X$ | is a random number issued by entity X |
| $t_i$ | is a time stamp issued at time = i |
| $dt_{i,j}$ | is the time interval between $t_i$ and $t_j$ |
| $dt_{max}$ | is an upper limit on a time interval used to determine how close, geographically, one device is to another. |
| time | is the time and date data provided by LS |
| loc | is the location data provided by LS |
| $E_K(Z)$ | is the result of the encipherment of data Z with a symmetric algorithm using the key K |

-continued

| | |
|---|---|
| $MAC_K(Z)$ | is the Message Authentication Code, generated by hashing data Z with the key K |
| $S_X(Z)$ | is entity X's private signature transformation operating on data Z |
| $V_X(S_X,Z)$ | is entity X's public verification transformation operating on X's signature $S_X(Z)$, and data Z |
| X \| \| Y | is the result of the concatenation of data items X and Y in that order |

In describing the methods the following conditions are assumed:

1) STB and ED have a secure execution environment.
2) STB and ED have a tamper-proof data storage area.
3) All cryptographic processing on STB and ED is carried out in the secure execution environment.
4) Only applications running in the secure execution environment have access to the tamper-proof data storage areas in the STB and the ED.
5) At least one authenticated key $K_{S,E}$ is shared by the entities STB and ED and is stored in the tamper-proof data storage areas in the STB and the ED.
6) At least one of the ED or STB possesses a public verification transform, $V_{CA}$, for a certification authority CA, stored in its tamper-proof data storage area.
7) The initial receiver, STB, possesses a DRM application stored in its tamper-proof data storage area.
8) The initial receiver, STB, has knowledge of the usage criteria for each service received.

If the link between the trusted network and the end device cannot be trusted then there is a fundamental problem: although it is easy to ensure that data has come from a trusted network, it is difficult to ensure that the data has not traveled a long distance. Data that has not been sent too far is called near. It is also important to know that data is not a replay of some earlier execution of the protocol. Data that has been recently generated (in particular data that is not being replayed) is fresh. It is necessary that the data can meet both these conditions if it is to be trusted.

There are three general approaches to ensuring the freshness of data: timestamps, logical timestamps and nonce based protocols. Timestamps are not applicable in this situation as the use of timestamps would mean that the end device knows the correct time which cannot be assumed. Logical timestamps can only be used to establish an ordering of messages, so they too do not seem to be appropriate for use in this situation. The methods of the invention are therefore based on the use of nonces.

On receiving a nonce, a network server provides a digital signature for a data string consisting of that nonce, the server's location and the current time. Obviously the use of digital signatures implies the need for the end device to trust the network's public key, but this could be solved by means of a certificate supplied by the content provider. An end user device can then accurately validate its time and location by sending a nonce to the nearest trusted network server and checking that:

1) the response has been signed correctly (entity authentication);
2) the response includes the correct nonce (freshness); and
3) that the time taken between sending the request and receiving the response is less than some threshold determined by the content provider (nearness).

If all of these conditions hold then the DRM application can trust the time and location information contained in the response.

The methods of the invention provide trustworthy location data to the end device within a margin of error at the time at which the protocol is executed. To ensure that the end device does not then move into the blackout region, the protocol can be repeated at regular intervals.

Figure 2:
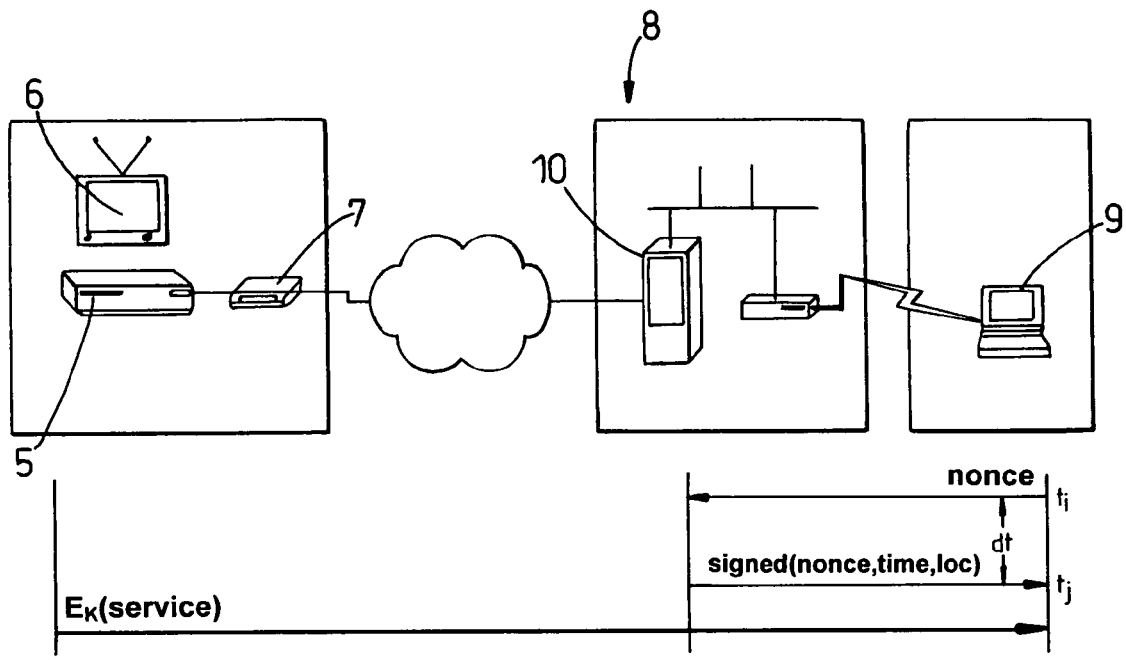
FIG. 2 is a schematic diagram showing operation of a first method.

In the first method, of FIG. 2, in addition to the previous conditions, it is assumed that the end device, ED, possesses a DRM application stored in its tamper-proof data storage area.

The method is initiated by the user requesting a service on ED which causes the DRM application to be loaded and the following steps executed.

1) ED→STB:
   Request for usage criteria\|\|$ID_{Service}$
2) STB→ED:
   $ID_{Service}$\|\|usage criteria\|\|$MAC_{K_{S,E}}$(usage criteria):
3) ED calculates: $MAC_{K_{S,E}}$(usage criteria)
   and compares the result with the received MAC to verify the origin and integrity of the usage criteria.
   If the usage criteria do not require time or location data then the remainder of the method is irrelevant. Otherwise it continues to check the usage criteria.
4) ED→IN: Request ID of nearest location server:
5) IN→ED: $ID_{LS}$.
6) ED→CA:
   Request certificate for location server\|\|$ID_{LS}$:
7) CA→ED: $Cert_{LS}$.
8) ED executes $V_{CA}(Cert_{LS})$ to verify $V_{LS}$.
   If $V_{LS}$ fails to verify then ED takes appropriate error handling actions. If $V_{LS}$ is verified, then it is stored in the tamper-proof data storage area on ED and the method continues.
9) ED generates a random nonce, $R_{ED}$.
10) The DRM application running on ED generates $t_i$ and stores it in the tamper-proof data storage area
11) ED→LS:$R_{ED}$
12) LS→ED:time\|\|loc\|\|$S_{LS}(R_{ED}$\|\|time\|\|loc)
13) The DRM application running on ED generates $t_j$ and compares it with $t_i$. If $dt_{i,j}$>$dt_{max}$ then ED is geographically too far from LS to provide reliable data and ED takes appropriate error handling actions. Otherwise, ED checks the validity of the signature provided by the location server using $V_{LS}$. This verifies the origin of the time and location data and verifies that the data has not been replayed. The DRM application can then check the usage criteria and request, or halt, delivery of the service as required.
14) ED→STB:
   Request for service\|\|time\|\|$MAC_{K_{S,E}}$(time). The MAC authenticates the origin and integrity of the request and prevents replay. This is necessary to defeat a user who is receiving a free service from injecting a request for a restricted service in step 1, blocking subsequent messages, and then injecting or replaying a request for service at this step.
15) STB then delivers the service identified by $ID_{Service}$ received in the preceding request for usage criteria.
16) STB→ED: $E_{K_{S,E}}$(Service):
17) The method repeats from step 9 to step 13 at regular time intervals determined by the DRM application. This ensures that ED remains within the permitted location.

For this method the DRM software requires access to an interval timer to compute $dt_{i,j}$, and this timer must be trusted by the content provider. The need for a trusted interval timer however, can be removed if content is provided in real-time. In such a case a logical interval timer is often embedded in the real-time stream.

The success of this scheme is heavily dependent on the allowed time delay. Choosing the threshold $dt_{max}$ for that time delay could be very difficult. If the threshold is too large then the data will be able to travel a long way out of the acceptable zone but if the threshold is too small then normal network delays can cause blackouts for legitimate users. The choice of threshold becomes even harder in a situation where the transmission speed for data in the mobile network keeps changing. Then, the set-top box or the intermediary network could pick the threshold based on information received from the content provider and the trusted part of the intermediary network.

The disadvantage of this is that it is computationally expensive: the end user device needs to generate a suitably random nonce, the third party network needs to generate a signature and the end user device needs to verify that signature. This puts a heavy strain on both the end device, who may not have the computational power to verify signatures quickly; and the third party network, who may have to sign lots of messages quickly.

To reduce the processing load on the end user device the second method provides for the bulk of the computation to be carried out by the set-top box. This also has the advantage that the set-top box has access to a better source of nonces which may be derived cryptographically from the random keys that are used to scramble the content. Typically these content encryption keys are changed several times a minute.

Figure 3:
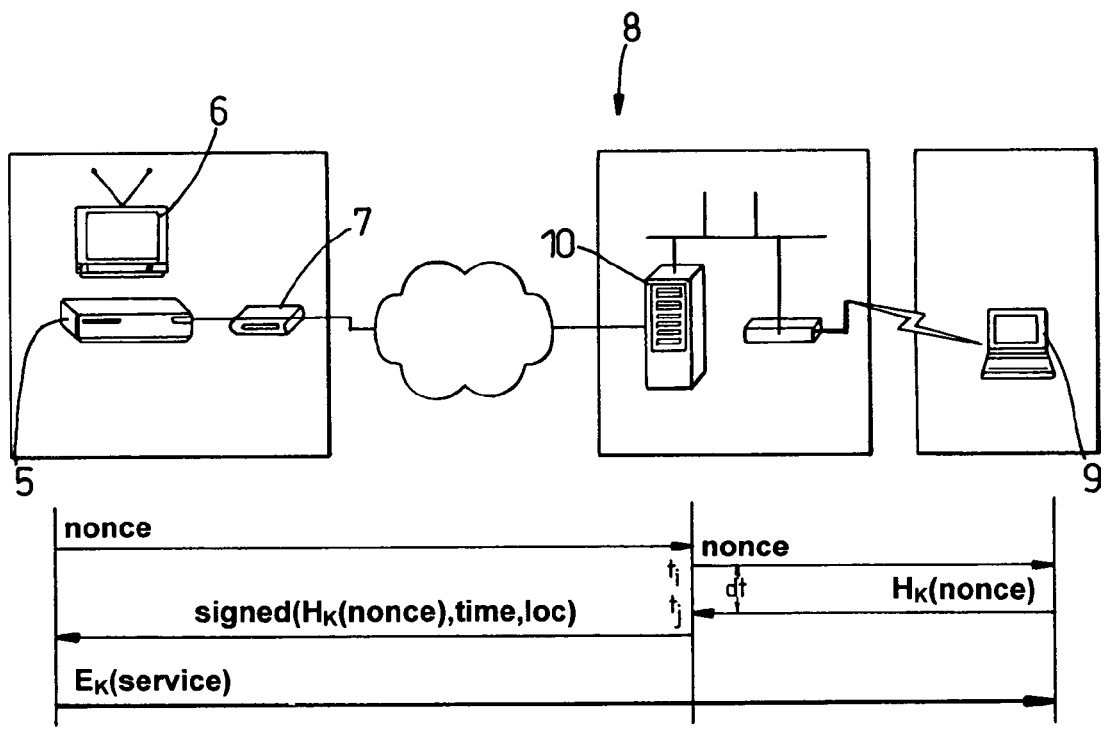
FIG. 3 is a schematic diagram showing operation of a second method.

The second method is shown in FIG. 3. In connecting to the network, the end user device has been authenticated, both to the network as a device and to the set-top box as the intended recipient of the data stream.

The method is initiated by the user requesting a service on ED which causes the following steps to be executed.

1) ED→STB:
   Request for usage criteria∥$ID_{Service}$:
2) STB executes the DRM application and determines the usage criteria for the service. If the usage criteria do not require time or location data then the remainder of the protocol is not relevant. Otherwise the protocol continues to obtain trusted usage criteria.
3) STB→IN:
   Request ID of location server nearest to ED.
4) IN→STB: $ID_{LS}$.
5) STB→CA:
   Request certificate for location server∥$ID_{LS}$:
6) CA→STB: $Cert_{LS}$.
7) STB executes $V_{CA}(Cert_{LS})$ to verify $V_{LS}$.
   If $V_{LS}$ fails to verify then STB takes appropriate error handling actions. Otherwise, if $V_{LS}$ is verified, then it is stored in the tamper-proof data storage area on STB and the protocol continues.
8) STB generates a random nonce $R_{STB}$.
9) STB→LS: $R_{STB}\|ID_{ED}$
10) LS generates $t_i$ and stores $t_i$ indexed by $ID_{ED}$.
11) LS→ED: $R_{STB}$
12) ED→LS: $MAC_{K_{S,E}}(R_{STB})$
13) LS generates $t_j$ and compares it with $t_i$ indexed by $ID_{ED}$. If $dt_{t,j}>dt_{max}$ then ED is geographically too far from LS to provide reliable data. In this case LS sends an error message to STB, and appropriate error handling actions are taken. Otherwise the protocol continues.
14) LS→STB:time∥loc∥$MAC_{K_{S,E}}(R_{STB})\|S_{LS}$(time∥loc∥$MAC_{K_{S,E}}(R_{STB})$)
15) STB then checks the validity of the signature provided by the location server using $V_{LS}$. This verifies the origin of the time and location data.
16) The STB then verifies $MAC_{K_{S,E}}(R_{STB})$ to authenticate ED.
   If the MAC cannot be verified then ED cannot be trusted. If the MAC is validated, then STB can trust that the device communicating with LS is ED, and that the data received has not been replayed.
17) The usage conditions (time and location) are then passed to the DRM application, which permits, or denies, delivery of the service ($ID_{Service}$) to ED as appropriate.
18) STB→ED: $E_{K_{S,E}}$(Service)
19) The protocol repeats from step 8 to step 17 at regular time intervals determined by the DRM application. This ensures that ED remains within the permitted location.

Again, this protocol ensures freshness from the use of nonces, nearness from the use of a time interval, entity authentication of the intermediary network by the use of a digital signature and entity authentication of the end device by the use of a shared key. The protocol requires the same measure of trust in the intermediary network as in the previous protocol but the trust in the end user device is reduced, as is the computational load on this end user device.

What is claimed is:

1. A method of controlling transmission of broadcast content from a content provider via a broadcast means to an end user device using an intermediary network and an intermediary network device where the broadcast means comprises a broadcast transmitter and a set-top box under the control of the broadcaster; and the intermediary network device comprises a stationary location server, whose location is known, and is verifiable to the broadcast means, the method comprising validating the time and location of the end user device when content is requested from the broadcast means by:

using the end user device to verify the identity of the location server connected to the intermediary network;
   generating a nonce at the end user device and sending said nonce from the end user device to the location server at a first time stored by the end user device;
   cryptographically processing said nonce received at the location server;
   sending time and location data and the cryptographically processed nonce from the location server to the end user device at a second time;
   storing the second time at the end user device as the time of receipt from the location server;
   comparing the interval between the first and second times with a predetermined time interval stored at the end user device;
   verifying, at the end user device, said time and location data received from the location server to verify the data has not been replayed;
   sending the time and the cryptographically processed nonce from the end user device to the set-top box;
   applying a cryptographic process to the data at the set-top box to verify the identity of the end user device; and
   delivering the content from the set-top-box to the end user device, if the identities are verified and the elapsed time interval is less than the predetermined time interval.

2. A method of controlling transmission of broadcast content according to claim 1, in which the sending of said nonce and the subsequent steps is repeated at regular intervals to ensure that the location of said end user device is still acceptable.

3. A method of controlling transmission of broadcast content according to claim 1, in which said end user device comprises a portable personal computer.

4. A method of controlling transmission of broadcast content according to claim 1, in which said end user device is connected to said intermediary network by wireless access.

5. A method of controlling transmission of broadcast content according to claim 1, in which said end user device comprises a mobile telephone.

6. A method of controlling transmission of broadcast content according to claim 1, in which said end user device comprises a personal digital assistant.

7. A method of controlling transmission of broadcast content according to claim 1, in which said broadcast means comprises a broadcast transmitter together with a set-top box, under the control of the broadcaster.

8. A method of controlling transmission of broadcast content according to claim 7, in which said set-top box stores usage criteria for the services supplied.

9. A method of controlling transmission of broadcast content according to claim 7, in which said broadcast transmitter is a terrestrial broadcast transmitter.

10. A method of controlling transmission of broadcast content according to claim 7, in which said broadcast transmitter is a cable broadcast transmitter.

11. A method of controlling transmission of broadcast content according to claim 7, in which said broadcast transmitter is a satellite broadcast transmitter.

12. A method of controlling transmission of broadcast content according to claims 7, in which said end user device and said set-top box each have microprocessors including a secure execution environment to carry out cryptographic processing, and tamper-proof data storage areas accessed only by programs running in said secure execution environment.

13. A method of controlling transmission of broadcast content according to claim 12, in which said set-top box has a DRM program stored in said tamper proof data storage area.

14. A method of controlling transmission of broadcast content according to claim 12, in which said end-user device has a DRM program stored in said tamper proof data storage area.

15. A method of controlling transmission of broadcast content according to claim 7, in which an authorised cryptographic key is shared by said set-top box and said end-user device, and at least one of them has a public verification for a certification authority, for verifying the identity of the location server.

16. A method of controlling transmission of broadcast content from a content provider via a broadcast means to an end user device using an intermediary network and an intermediary network device where the broadcast means comprises a broadcast transmitter and a set-top box under the control of the broadcaster; and the intermediary network device comprises a stationary location server, whose location is known, and is verifiable to the broadcast means, the method comprising validating the time and location of the end user device when content is requested from the broadcast means by:

using the set-top box to find the location server nearest to the end user device;

using the set-top box to verify the identity of the location server connected to the intermediary network;

sending a nonce and identity of the end user device-from the set-top box to the location server;

storing a first time as the time of receipt at the location server of said nonce from the set-top box, and forwarding said nonce to the end user device;

applying a cryptographic process to the nonce at the end user device, and returning the nonce, cryptographically processed, to the location server;

storing a second time at the location server as the time of receipt of the cryptographically processed nonce from the end user device;

comparing the interval between the first and second times with a predetermined time interval stored at the location server;

sending time and location data and the cryptographically processed nonce, and cryptographically processing by the location server the time and location data and the cryptographically processed nonce and sending from the location server to the set-top box;

applying a cryptographic process, at the set-top box, to the information cryptographically processed by the location server to verify the time and the location data, and the nonce to verify the identity of the end user device; and delivering the content from the set-top box to the end user device, if the identities are verified and the elapsed time interval is less than the predetermined time interval.

\* \* \* \* \*